United States Patent [19]

Johnson et al.

[11] Patent Number: 4,603,577

[45] Date of Patent: Aug. 5, 1986

[54] APPARATUS FOR DETERMINING THE SWING INERTIA OF GOLF CLUBS

[76] Inventors: Louis W. Johnson; Bruce G. Johnson, both of 2435 Prairie Rd., Eugene, Oreg. 97402

[21] Appl. No.: 684,610

[22] Filed: Dec. 21, 1984

Related U.S. Application Data

[63] Continuation-in-part of Ser. No. 525,941, Aug. 24, 1983, abandoned.

[51] Int. Cl.⁴ ............................................. G01M 1/12
[52] U.S. Cl. ...................................................... 73/65
[58] Field of Search .......................... 73/65; 273/77 A

[56] References Cited

U.S. PATENT DOCUMENTS

| | | | |
|---|---|---|---|
| 2,595,717 | 5/1952 | Smith | 73/65 |
| 3,371,523 | 3/1968 | Crouch et al. | 73/65 |
| 3,577,771 | 5/1971 | Solheim | 73/65 |
| 3,698,239 | 10/1972 | Everett | 73/65 |
| 3,703,824 | 11/1972 | Osborne et al. | 73/65 |
| 4,058,312 | 11/1977 | Stuff et al. | 73/65 X |
| 4,261,566 | 4/1981 | Macdougall | 73/65 X |

OTHER PUBLICATIONS

Square Two—Apr. 1984 Golf Digest.

*Primary Examiner*—Charles A. Ruehl
*Attorney, Agent, or Firm*—Eugene M. Eckelman

[57] ABSTRACT

A scale is provided for establishing a swing inertia value of golf clubs by providing support means arranged to contact the grip portion of the club such that the axis of rotation of a person's grip on the grip portion of the club when in the act of swinging the club is disposed vertically above the pivotal axis of a balance beam of the scale. The scale supports a golf club for determining such swing inertia value and includes calibrations which comprise values determined by multiplying the head weight of the club by the length of the club shaft extending from the pivotal axis of the balance beam to the center of gravity of the club head. The scale can also be used to determine the head weight of a club.

8 Claims, 6 Drawing Figures

APPARATUS FOR DETERMINING THE SWING INERTIA OF GOLF CLUBS

REFERENCE TO PRIOR APPLICATIONS

This application is a continuation-in-part of application Ser. No. 525,941, filed Aug. 24, 1983, abandoned.

BACKGROUND OF THE INVENTION

This invention relates to a new and useful apparatus for determining the swing inertia of golf clubs.

Golf clubs manufacturers have arrived at a method of what they term a balance of the clubs in order that all the clubs in a set supposedly can be matched for swing feel. Such is known as the "swing weight" of the clubs and as stated is intended to give the golfer the same swing feel of all clubs in the set. Such swing weight is not a determination of the center of gravity of a club but appears only to be an assumed location on the club of a point for calibrating a uniform feel of all the clubs in a set.

A beam scale is used having a slidable weight which can be adjusted relative to calibrations reading in letters and divisions thereof, such as D1, D2, etc. The butt end of the club is set against a stop on the scale approximately 14 inches from the beam pivot. A two iron is usually about 39 inches long and clubs with more loft reduce in length in approximately one-half inch increments through the nine iron and wedge. When a two iron is placed on the scale, approximately 25 inches extend beyond the scale's pivot point toward the club head. As the progressively shorter clubs are gauged on the scale, the heads obviously must increase in weight to maintain the same balance position of the sliding weight and the scale reading. It is customary to add or delete weight from the butt end of the club to achieve the desired swing weight balance of the club.

The above method and apparatus for determining the swing weight of clubs have the disadvantage that the ratio of the distances between the beam pivot of the scale and the butt end of the club and the pivot and the club head end requires rapid and excessive increase of weight to maintain the balance, with the result that when a golfer swings a two iron for example it will feel lighter than when he or she swings a nine iron. This of course destroys the present intention of swing weight because such intention is to obtain an identical swing feel for all clubs. Obviously, such feel is not present.

Another disadvantage of the presently used method and apparatus for changing the swing weight of clubs is that when weight is added to the butt end of the clubs to bring the swing weight down, the club will obviously increase in overall weight. Thus, if a golfer wants to reduce the swing weight of his or her clubs, weights are placed in the butt end of the clubs. While this may provide a balance on the scales presently used to reduce the swing weight of the club, the actual weight of the club is increased. If a person desires a reduced swing weight, it follows that the person also desires a club of lighter over-all weight, and this increased weight of the clubs may be extremely disadvantageous to persons who do not want a heavier club.

According to the present invention and forming objectives thereof, apparatus is provided for establishing a swing feel for golf clubs that is concerned with the pivot position of the clubs relative to the inertial resistance to wrist and hand torque applied to the clubs rather than with an arbitrary point of balance which exists on the shaft forward of the grip of the club. The present apparatus provides a means for precisely matching all the clubs in a set for the same feel and for coordinating what is termed herein as the swing inertia with the overall weight of the club, as well as a means which appears to be more logical when considering that the feel of the club is related to torque applied through the hands and wrists.

In carrying out the objectives of the invention, the method of the apparatus comprises the steps of using a calibrated set of values of swing inertia and gaging the clubs in a set on a gravitational scale provided with the said calibrations. The clubs are counterbalanced at the axis of rotation of a person's normal grip on the grip portion for swinging the club, and each club is adjusted to a similar swing inertia calibration by varying the weight of the head of the club. The calibrations comprise the length of the club shaft from the scale pivot point to the center of gravity of the club head multiplied by the head weight of the club. To accomplish this method of determining the swing inertia of clubs, a gravitational scale includes a balance beam with support means for supporting a golf club in parallel relation therewith. The beam supports the club thereon with the point comprising the axis of rotation of a person's hands as gripped on the grip portion of the club disposed vertically above the pivot point of the beam. Calibrations on the scale comprise the length of the golf club from the scale pivot point to the center of gravity of the head multiplied by the head weight of the club. The support for the club is adjustable for positioning different length clubs with the axis of rotation of the hands disposed vertically above the pivot point of the beam. The scale also includes means for determining the overall weight of the clubs.

The invention will be better understood and additional objects and advantages will become apparent from the following description taken in connection with the accompanying drawings.

BRIEF DESCRIPTION OF THE DRAWINGS

FIGS. 4, 5 and 6 are sectional views taken on the lines 4—4, 5—5 and 6—6 of FIG. 3.

DETAILED DESCRIPTION OF PREFERRED EMBODIMENT

Figure 1:
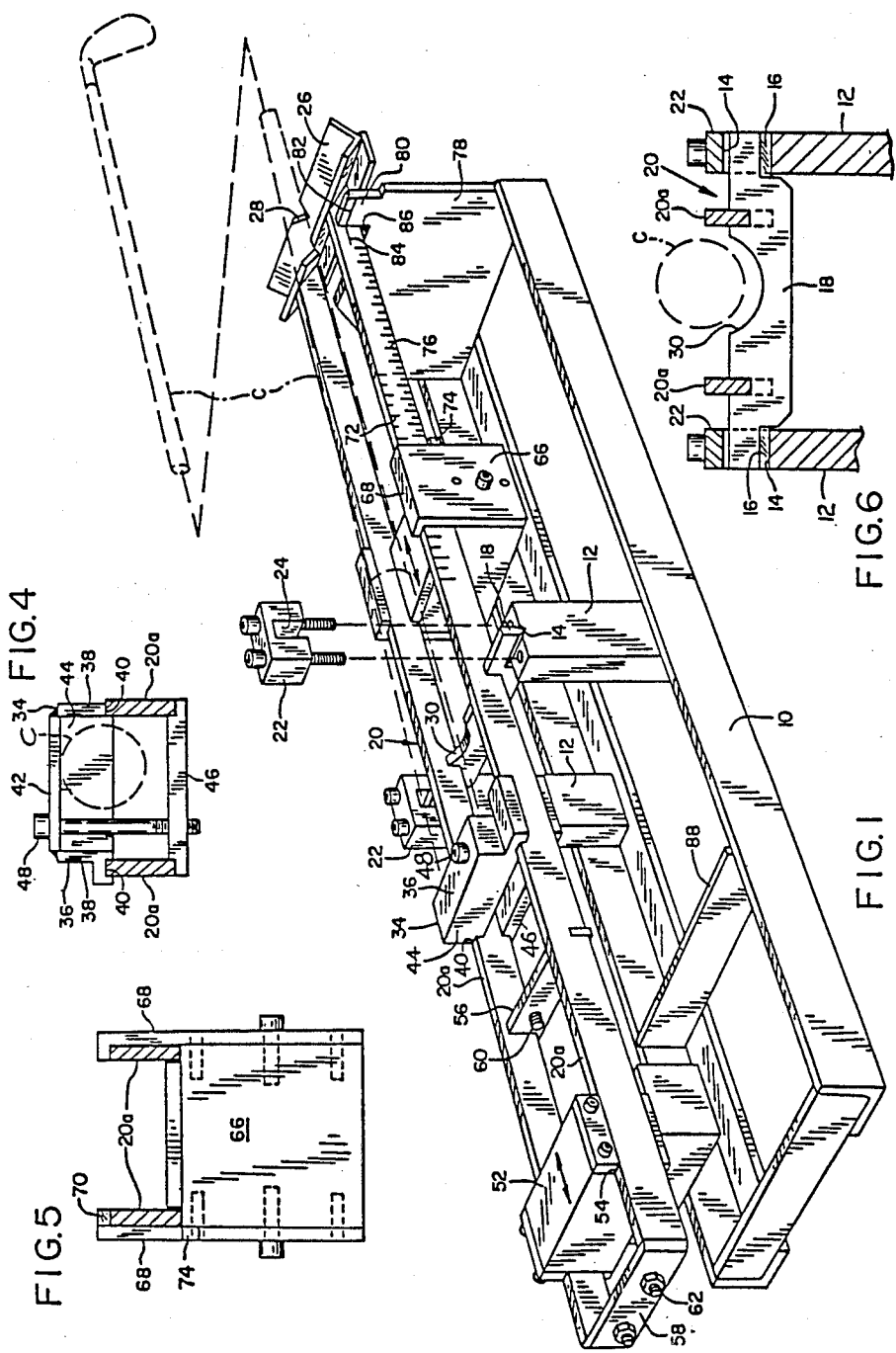
FIG. 1 is a perspective view of a scale embodying features of the present invention.
Figure 2:
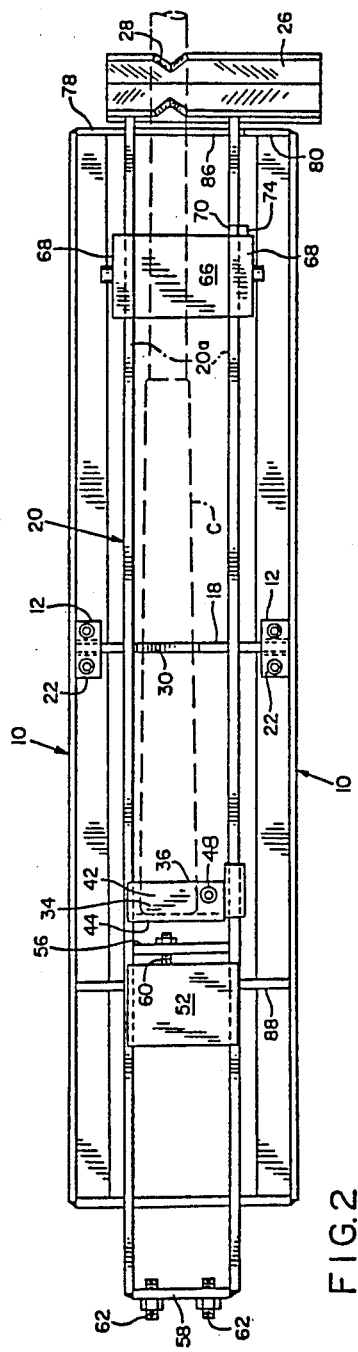
FIG. 2 is a top plan view of the scale.
Figure 3:
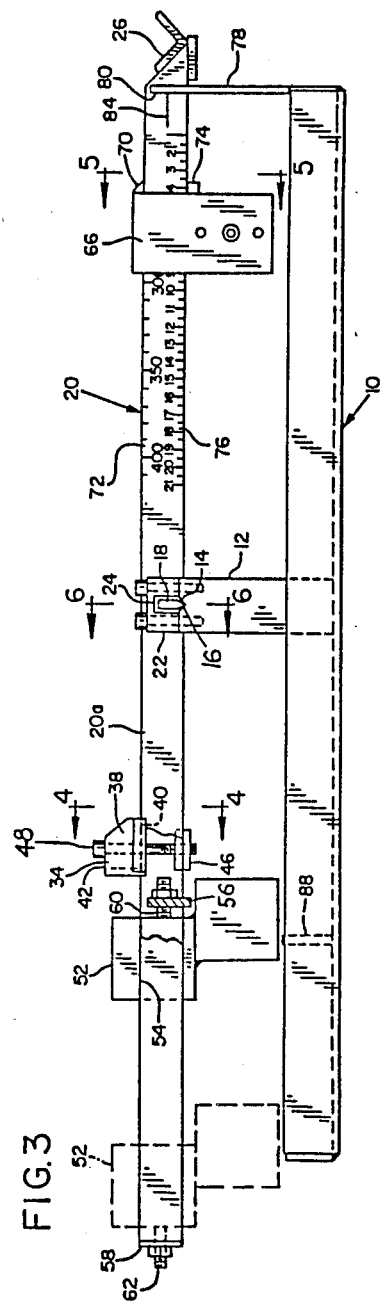
FIG. 3 is a side elevational view thereof, a portion of such scale being broken away to show detail.

With reference to the drawings and first to FIGS. 1-3, the scale of the invention comprises a base 10 having a pair of integral side standards 12 each having a transverse V-shaped notch 14 on the top thereof. These notches are engaged by knife edges 16 of a cross bar 18, also seen in FIG. 6, integral with a balance beam 20 having a pair of side rails 20a and being supported over the base in longitudinal alignment. Cross bar 18 is integral with the rails 20a to secure such rails together at this intermediate point and is held on the standards in assembled relation by caps 22, these caps having a transverse slot 24 of a suitable dimension to capture the bar but yet allowing the bar to pivot through the limit movements of the balance beam.

The balance beam 20 has an integral club support member 26 at the front end thereof which secures the rails 20a together at the front. This club support member has a longitudinal notch 28 for receiving a shaft portion of a golf club C. Member 26 is trough shaped at its transverse dimension and is somewhat elongated so as to support a club crosswise for a reason to become more apparent hereinafter. The cross bar 18 has a top notch 30 which is aligned longitudinally with the notch 28 and which is arranged to receive a grip portion of a golf club.

Balance beam 20 supports a positioning member 34, also seen in FIG. 4, for positioning the butt end of a golf club at selected distances from the pivot point 14. To accomplish this positioning feature, member 34 comprises an inverted cup-like body portion 36 having side walls 38 with bottom longitudinal notches 40 which provide seated engagement of the member 34 on the rails 20a. Body portion 36 is open at the front but has a top wall 42 and a rear wall 44, and this portion is arranged to be clamped at selected positions on the balance beam 20 by a bottom clamp plate 46 releasably held in place for adjustment of the member 34 by a screw 48 threadedly engaged with the clamp plate and having its head accessible at the top of the member. The body 36 is arranged to receive the butt end of a golf club therein, the top wall 42 forming an abutment limiting upward movement of this butt end and the rear wall 44 forming a stop for positioning such butt end a selected distance rearwardly of the pivot point 14 for reasons to be explained.

The balance beam has a counterweight 52 at the rearward end thereof. This counterweight has side notches 54 for receiving the rails 20a and for supporting the weight on the rails in slidable relation. Forward and rearward transverse stops 56 and 58, respectively, for the counterweight are secured to the balance beam, and as will be seen are arranged to position the weight in a forward position for weighing the club and in a rearward position to determine the swing inertia of the club. Forward stop 56 has adjustable abutment screws 60 and rearward stop 58 has adjustable abutment screws 62 for fine adjustment in the balancing of the scale.

The balancing weight of the scale, also seen in FIG. 5, is designated by the numeral 66 and is located forward of the pivot point 14. It has upper flanged extensions 68 which engage the top edge of the rails 20a and support this weight for longitudinal adjustable movement on the rails. The forward edge of the balancing weight has an upper forwardly extending projection 70 forming a pointer associated with a swing inertia scale 72 and this forward edge also has a lower projection 74 forming a pointer associated with a club weight scale 76. The forward end of the frame 10 has an upstanding transverse wall 78 with an upper extension 80 at one side provided with an aligning mark 82 arranged for association with an aligning mark 84 on the balance beam 20 to indicate the balanced condition of the scale. The top edge 86 of the wall 78 serves as a limit abutment for the balance beam in the one direction. A transverse frame piece 88 on the base 10 is located at the rear so as to be engaged by the counterweight in the forward position of the latter to serve as a limit abutment in the other direction of rotation of the balance beam. The counterweight engages the rear of the frame 10 as a limit abutment in the rearward position of the counterweight.

As stated hereinbefore, the present apparatus involves a concept wherein the "feel" of a golf club for swinging it is at the axis of rotation of a person's normal grip on the grip portion of the club when in the act of swinging the club. This gives a true feel of the club with relation to the hands, as opposed to an assumed swing weight that is located on the shaft forward of the grip. The concept of establishing the feel of a club at the axis of rotation of a person's normal grip is made fairly obvious when one realizes that the club is gripped by the golfer's hands at the butt end, normally very close to the extreme end of the club. This is the position where wrist torque is applied to accelerate the club head to the greatest limit of the golfer's ability, and thus the axis of rotation of the persons's grip as gripped on the club is the most obvious place to feel the inertia of the club as the acceleration progresses.

In carrying out the concept of the invention, the axis of rotation of the grip as gripped on the club when in the act of swinging the club comprises the pivot point on the scale and thus adjustment is made for each club with this axis located vertically above the pivot point or pivotal axis 14 of the scale. Thus, to determine the swing inertia of a club, the positioning member 34 is adjusted longitudinally on the balance beam 20 so that with the club lying in the notches 28 and 30 and the butt end engaged against the inner surface of rear wall 40, the axis of rotation of the grip is over the pivot point of the scale. This counterbalancing adjustment is made according to the size of the hands and if necessary according to the position of the hands on the grip. The axis of rotation of a person's grip may in some instances be halfway between the grip, namely, at the point between the hands, but in other instances, this axis may vary within the outer dimensions of the grip and not be halfway since one hand may be stronger than the other or the golfer may have individual peculiarities in his or her grip or swing. Also, a person may have a physical defect in one or both hands, or only have one hand, and yet the present axis of rotation concept can be used to establish a true feel of all the clubs in a set. The desired value of the swing inertia is readily obtained by reducing the weight of the club or increased by adding weight to the head of the club. In the original manufacture of clubs, the axis of rotation of the grip can be standardized for men and women or for large and small hands, and if a person desires to alter the feel of the club, it is merely necessary to add weight to or subtract it from the head of the club. Clubs in a set can also be readily matched at a later time by altering the weight of the head as noted above.

The present scale is especially functional in combination with the golf iron construction set forth in our U.S. Pat. No. 4,540,178. That is, with proper analyzing of golfer variables as explained above for determining swing inertia of golf irons, such irons can be precisely constructed with proper head weight.

Also in carrying out the concept of the invention, the scale is balanced and the calibrations 72 located so that the desired determination can be made. In a preferred arrangement the calibrations comprise the weight of the head in ounces multiplied by the length in inches between where the hands butt together on the grip and the center of gravity of the head. For example, if the weight of the head is 10.2 ounces and the length of the shaft from the axis of rotation of the hands, namely, the lever arm, is 35¼ inches, the swing inertia of the club is approximately 360. This value is referred to as inch ounces. Thus, if a person has arrived at a desired swing inertia value, it is merely necessary, in order to match all of his or her clubs to a uniform swing inertia, to use the same grip point on the club as a guide and increase or reduce the weight of the club head as necessary to bring the scale reading to the same value for each club. Importantly, the decrease of the swing inertia value will decrease the over-all weight of the club and vice versa.

Another advantage of this weighing and calibrating system is that each club in a set can be very precisely proportioned in its swing inertia relative to its companions, for example, if a player wants each club to be progressively heavier by two scale points, it can be precisely weighted to hand feel. This inertial swing weighting and calibrating system is not limited to just making possible that all clubs in a set will have the same swing feel. The scale can be made to reach the inertial weight and gross weight of any club that any player would be capable of using. Normally this range would be between 270 and 420 inch ounces on the swing inertial scale.

Scale 76 is calibrated and the parts of the scale coordinated so that with the club laid transversely in the member 26 and the counterweight 52 adjusted forwardly into abutments 60, the over-all weight of the club can be determined by the position of balancing weight 66 on this scale.

Also, the present scale can be used to determine the weight of a club head. For this purpose, the following formula is used:

$$\text{Head Weight} = \frac{W - \left[(D + d)\frac{(M - 2dM)}{L}\right]}{L - d}$$

where:
W = scale reading in inch-ounces
L = full length of shaft from butt end to center of gravity of the head
d = distance from scale pivot to butt end of the shaft
M = known weight of shaft in ounces
D = [(L−2d)/2]

As an illustration, it will be assumed that
W = 360 inch ounces
L = 39 inches
d = 5 inches
M = 3.2 ounces $$\text{Solving for } D = \frac{L - 2d}{2} = \frac{39 - (2 \times 5)}{2} = 14.5 \text{ inches}$$

$$\text{Head Weight} = 360 - \frac{\left[(14.5 + 5)\left(3.2 - \frac{10 \times 3.2}{39}\right)\right]}{39 - 5} =$$

10.52 ounces

In computing the above head weight, the weight of the shafts is known, for example, M=3.2 ounces. By deducting from the overall length of the shaft twice the distance from the pivot of the scale to the butt, for example approximately 10 inches if that distance is 5 inches, one can calculate the remaining weight of the shaft and its center of gravity's distance from the pivot. Multiplying these two and deducting the result from the inch-ounce factor of the original weight and diving the difference by the length of the shaft from the pivot to the club head will give the actual weight of the club head.

It is to be understood that the form of our invention herein shown and described is to be taken as a preferred example of the same and that various changes in the shape, size and arrangement of parts may be resorted to without departing from the spirit of our invention, or the scope of the subjoined claims. For example electronic digital weighing can be used for rapid weighing and for production manufacturing.

Having thus described our invention, we claim:

1. A scale for weighing golf clubs to determine the swing inertia thereof, said clubs having a head portion, a shaft portion, and a grip portion for receiving the golfer's hands in adjacent gripped relation, said scale comprising
   a base,
   a balance beam having pivot support on said base,
   calibrations on one of said base and beam providing a set of values of swing inertia,
   and support means on said balance beam having forward and rearward support portions for supporting a golf club in parallel relation with said balance beam,
   said rearward support portion being adjustable along said balance beam and arranged to contact the grip portion of the club and locate the club such that the axis of rotation of a person's normal grip on said grip portion for swinging the club is disposed vertically above the pivotal axis of said balance beam,
   said calibrations comprising values determined by multiplying the head weight of the club by the length of the club extending from the said pivotal axis to the center of gravity of the head.

2. The scale of claim 1 wherein said rearward support portion is arranged to contact the grip portion of the club such that the axis of rotation of a person's normal grip on said grip portion for swinging the club is approximately halfway between the hands.

3. The scale of claim 1 wherein said rearward support portion comprises abutment means for abutment by the grip end of a golf club supported on said support means.

4. The scale of claim 1 for also determining the overall weight of a golf club including a counterweight on said balance beam adjacent a rearward portion thereof, said counterweight having a first position spaced from the pivot support for counterweighting said balance beam in a function of determining the swing inertia of a golf club and having a second position closer to said pivot support than said first position for counterweighting said balance beam in a function of determining the overall weight of a golf club.

5. The scale of claim 4 wherein said counterweight is slidably supported on said balance beam between a pair of adjustable abutment means mounted on said beam, said abutment means providing adjustable stops for accurately positioning said counterweight at said first or second position.

6. The scale of claim 1 for also determining the head weight of a golf club wherein the distance from said pivotal axis of said balance beam to the butt end of the club at said adjustable rearward support portion can be combined with said calibrations and with the length of the club from the butt end thereof to the center of gravity of the head portion and also with the known weight of the club shaft to determine the head weight of a golf club.

7. A scale for weighing golf clubs to determine the swing inertia thereof, said clubs having a head portion, a shaft portion, and a grip portion for receiving the golfer's hands in adjacent gripped relation, said scale comprising a base, a balance beam having pivot support on said base, calibrations on one of said base and beam providing a set of values of swing inertia, and support means on said balance beam having forward and rearward support portions for supporting a golf club in parallel relation with said balance beam, said rearward support portion being adjustable along said balance beam and arranged to position the grip portion of the club such that a point in the grip portion which is halfway between the normal gripped portion thereof is disposed vertically above the pivotal axis of said balance beam, said calibrations comprising values determined by multiplying the head weight of the club by the length of the club extending from the said pivotal axis to the center of gravity of the head.

8. A scale for weighing golf clubs to determine the swing inertia thereof, said clubs having a head portion, a shaft portion, and a grip portion for receiving the golfer's hands in adjacent gripped relation, said scale comprising a base, a balance beam having pivot support on said base, calibrations on one of said base and beam providing a set of values of swing inertia, and support means on said balance beam having forward and rearward support portions for supporting a golf club in parallel relation with said balance beam, said support means having one fixed support and one adjustable abutment which permits locating the grip portion on the shaft at any point relative to the pivotal axis of the beam, said calibrations comprising values determined by multiplying the head weight of the club by the length of the club extending from the said pivotal axis to the center of gravity of the head.

* * * * *